C. R. PERRY, C. M. FINCH & M. L. RICE.
FILTER.
APPLICATION FILED OCT. 19, 1908.
915,038.
Patented Mar. 9, 1909.
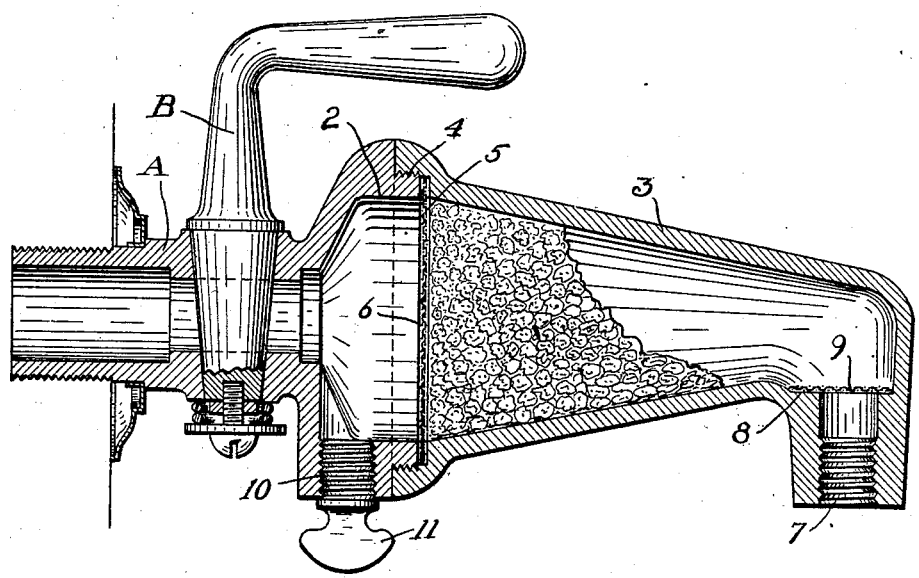
WITNESSES
INVENTORS
GORTEZ R. PERRY, CHARLES M. FINCH
AND MELVIN L. RICE.
BY
Geo. H. Strong
THEIR ATTORNEY

UNITED STATES PATENT OFFICE.

CORTEZ R. PERRY, CHARLES M. FINCH, AND MELVIN L. RICE, OF SAN FRANCISCO, CALIFORNIA; SAID PERRY AND RICE ASSIGNORS TO SAID FINCH.

FILTER.

No. 915,038.	Specification of Letters Patent.	Patented March 9, 1909.

Application filed October 19, 1908. Serial No. 458,408.

*To all whom it may concern:*

Be it known that we, CORTEZ R. PERRY, CHARLES M. FINCH, and MELVIN L. RICE, citizens of the United States, residing in the city and county of San Francisco and State of California, have invented new and useful Improvements in Filters, of which the following is a specification.

Our invention relates to a combined faucet and filter.

It consists in the combination and arrangement of parts, and in details of construction which will be more fully explained by reference to the accompanying drawings, in which the figure is a vertical section.

It is the object of our present invention to combine a faucet and a filter in a single structure, with means whereby the filter portion may be removed for inspection, and a by-pass connection through which water may be drawn directly.

A is a faucet barrel, screw-threaded or otherwise constructed to make the proper connection with the source of supply, and B is the turnable plug by which the passage through the barrel is opened or closed.

The outer end of the device is expanded and enlarged as shown at 2 so as to have an area very much greater than that of the barrel proper; and this forms a receiving chamber into which the water first enters, and in which it is allowed to spread out to fill the larger area.

3 is a convergent section, and the two parts are screw-threaded or otherwise fitted to be united, as shown at 4. A depressed shoulder is here shown in the interior of the enlarged end of the part 3, just below the screw-threads, and in this is fitted a screen 5. This screen is preferably made of fine material, and may be protected against pressure by a heavier and coarser screen 6. The outer and smaller end of the part 3 is turned downwardly as shown, and forms a discharge opening 7. Between the discharge opening and the interior of the smaller end of the cone 3 is an annular shoulder or ledge 8, and upon this is fitted a properly reinforced screen 9.

The space between the two screens 5 and 9 is filled with any suitable filtering material so that when the faucet has been opened, the water entering through the barrel, spreads out into the enlarged chamber 2, and thence passing through the screen 5, enters the filtering material, and eventually passes out through the discharge 7. The heavier material held in suspension in the water will be arrested upon the surface of the screen 5, and the water passing through the screen, and through the filtering material will gradually deposit any remaining impurity within the filter so that the water will be substantially clear of impurities.

10 is an opening into the lower part of the chamber 2, closable by a screw plug 11, and this screw-plug is adapted to fit also the discharge opening 7.

Whenever it is desired to draw water directly, without filtering, by removing the plug 11, and introducting it into the opening 7, the opening 10 forms a by-pass through which water may be drawn directly, and without filtering. This also serves as a means for cleansing the filter, since the wash of the water running freely through the chamber 2, will cleanse the impurities from the surface of the screen, and by closing the supply cock and connecting an inlet with the discharge opening 7 there will be a certain pressure which will cause the water to percolate through the filtering portion, and return to the discharge 10, thus also cleansing the filter itself.

When water is of such character that in spite of all filtering, it still has a muddy appearance, it is customary to employ certain chemical substances to give the water a transparent appearance. In this faucet we are enabled to place such chemicals within the chamber 2, and thus not only filter the water, but make it transparent.

Having thus described our invention, what we desire to protect by Letters Patent is—

1. A faucet barrel having a controlling plug, an enlarged extension exterior to the plug, a convergent filtering chamber and means for connecting the filter with the faucet enlargement to form an integral structure, said faucet enlargement having an opening, and the filter chamber having a similar opening at its outer end, and a plug whereby either opening may be closed.

2. A faucet having a barrel and plug, an enlarged portion exterior to the plug having screw-threads upon its periphery, a filter chamber having one end screw-threaded to fit the threads of the enlarged faucet end, said chamber converging and having a downwardly curved elbow at its outer end, a shoulder in the larger end, a reinforced screen supported upon said shoulder and clamped thereon, a second screen fixed in the discharge portion of the extension, and a body of filtering material forming a filling between the two screens.

3. In a combined faucet and filter of the character described, a faucet barrel cast with an outer chamber of large diameter, a filter chamber, means by which the contiguous ends of the two chambers are united, and a reinforced screen clamped between the said ends, said filter chamber having a downwardly curved elbow and discharge opening, a shoulder within said opening, and a reinforced screen carried thereon, a body of filtering material contained between the two screens, a by-pass opening from the faucet chamber, and a plug fitting said opening, and also the discharge opening at the end of the filter.

4. In a faucet and filter of the character described, the faucet portion having an open receiving chamber of large area, and a controlled by-pass therefrom, a removable tapering filter chamber having a downwardly turned elbow at its outer end, screens fixed between the contiguous ends of the faucet chamber and filter chamber, and at the discharge elbow, and a body of filtering material forming a filling of constantly decreasing area from the receiving to the discharge end of the filter.

In testimony whereof we have hereunto set our hands in presence of two subscribing witnesses.

CORTEZ R. PERRY.
CHAS. M. FINCH.
MELVIN L. RICE.

Witnesses:
  M. D. Brown,
  W. D. Bell.